Feb. 9, 1971 R. H. DAVIS ET AL 3,562,711

APPARATUS FOR DETECTING CIRCUIT MALFUNCTIONS

Filed July 16, 1968

INVENTORS
PAUL E. BOUDREAU
JERRY S. HARRIS
ROBERT H. DAVIS

BY Thomas & Thomas
ATTORNEYS

3,562,711
APPARATUS FOR DETECTING CIRCUIT MALFUNCTIONS

Robert H. Davis and Paul E. Boudreau, Raleigh, and Jerry S. Harris, Cary, N.C., assignors to International Business Machines Corporation, Armonk, N.Y., a corporation of New York Filed July 16, 1968, Ser. No. 745,300
Int. Cl. G08c *25/00;* H04l *1/10*
U.S. Cl. 340—146.1 10 Claims

ABSTRACT OF THE DISCLOSURE

A device for detecting circuit malfunctions in certain linear switching circuits operated in successive time periods which has a first circuit for generating a predicted parity signal for each successive time period, a parity check circuit for generating a signal indicative of actual parity during each successive time period, and a comparator for comparing the signals representing the predicted parity and the actual parity during each successive time period, thereby to indicate any circuit malfunction during each such successive time period.

BACKGROUND OF THE INVENTION (1) This invention relates to a device for detecting circuit malfunctions, and it relates more specifically to such devices employed in connection with the linear switching circuits such as a shift register, serial accumulator, and the like.

(2) In certain types of data transmission systems information is forwarded in serial fashion from one station to another, and it is customarily a message in the form of a polynominal $D(X)=d_nX^n+ \ldots +d_1X+d_0$. At the transmitting station the message polynomial D(X) is divided by a generator polynomial G(X), and the remainder R(X), usually designated a check character is forwarded with the message polynominal immediately at the end thereof. At the receiving station the message polynominal is shifted serially into a data buffer register where it is stored until the received message is checked and found to be correct at which time it may be transferred to and utilized by a load device. Simultaneously as the received message is inserted into the data buffer register, it is inserted also into a serial arithmetic device which divides the message polynominal D(X) and the check character or remainder R(X) by a generator polynomial G(X) as the message is received bit by bit serially, and if the transmitted message is received without error, the remainder of this division process is equal to zero. Patent 3,336,467 provides a more detailed discussion of this particular way of checking the accuracy of transmitted messages as well as a demonstration of its validity. If a message is correctly transmitted and correctly received, this fact is indicated by the presence of a remainder of zero in the serial arithmetic device at the completion of the division process. If the remainder in the serial arithmetic device at the end of the division process is not zero, this condition signifies that the received message polynomial is not error free. Hence, it is discorded from the data buffer register, and retransmission of the message may be requested. It is assumed thus far that any error in a data transmission occurs either at the transmitting station or in the transmission network. However, if a malfunction occurs in the equipment at the receiving station which causes the remainder in the serial arithmetic device to be other than zero at the end of the division process, the received message is nevertheless discarded from the data buffer register even though the message was correctly sent and correctly received. It is desirable to reduce traffic on a transmission system and to avoid retransmission in such cases by being able to detect malfunctions in a receiving station during each successive time period in which data is received, and it is to this problem that the present invention is directed.

SUMMARY OF THE INVENTION

It is a feature of this invention to provide an improved arrangement for detecting malfunctions in equipment at a receiving station in communication equipment and data processing apparatus.

It is a feature of this invention to provide an improved arrangement for detecting malfunctions which is highly reliable, nominal in hardware, and consequently relatively inexpensive to manufacture and maintain.

In one arrangement according to this invention a parity check circuit is employed to generate actual parity based on the content of a serial arithmetic device during each successive time period in which data is sent bit by bit. A circuit arrangement also is provided for predicting parity at time $t+1$ in response to the parity at time $t$ and (1) the input bit I at time $t+1$ if G(X) uses even parity, or (2) the quantity $R_{k-1}$ from the high order stage of the serial arithmetic device at time $t$ if G(X) uses odd parity. A further circuit is provided for comparing the actual parity developed by the parity check circuit and the predicted parity developed by the circuit arrangement for providing predicted parity, and if the two parity signals are unlike, an output signal is provided which indicates an error resulting from a circuit malfunction at the receiving station. Data transmitted in serial form is sent bit by bit in successive time periods. The detection apparatus according to this invention is operated in each successive time period, and any malfunction is detected in each successive time period in which it occurs.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
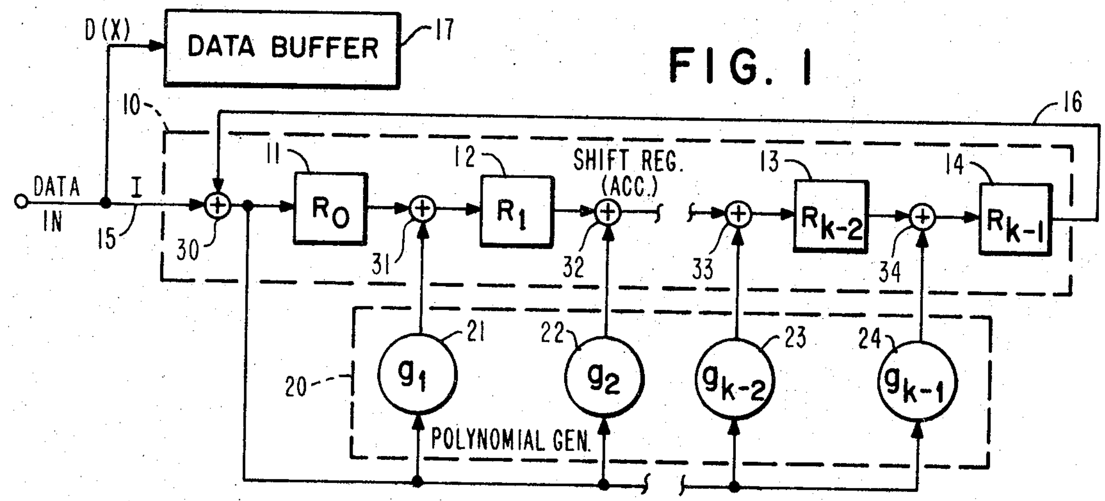
FIG. 1 shows in detail a serial arithmetic device and a polynominal generator the stages of which are labelled with methematical symbols used hereinafter to explain the particular arrangement for checking data transmissions.

Referring to FIG. 1, a shift register 10 includes stages 11 through 14 designated respectfully as $R_0, R_1 \ldots R_{k-2}$, and $R_{k-1}$. A polynominal generator 20 includes stages 21 through 24 designated respectively as $g_1, g_2 \ldots g_{k-2}$, and $g_{k-1}$. The shift register 10 performs as an accumulator, and for this reason modulo 2 adders 30 through 34 are provided. For reasons explained more fully in Pat. No. 3,336,467 the incoming data supplied to the shift register 10 is divided by the polynominal disposed in the generator 20. The register stages 11 through 14 each constitute a one-bit-position storage device R. The stages 21 through 24 of the polynominal generator 20 each constitute a multiplier which multiplies by $g$. The modulo 2 adders 30 through 34 may be simply exclusive Or circuits. Input data on a line 15 is denoted by the symbol I. Output signals on a line 16 from the stage 14 are supplied to the exclusive Or circuit 30. Input signals on the line 15 are supplied to a buffer 17. After the checking process is completed, data in the buffer 17 is transferred to a load device, not shown.

Figure 2:
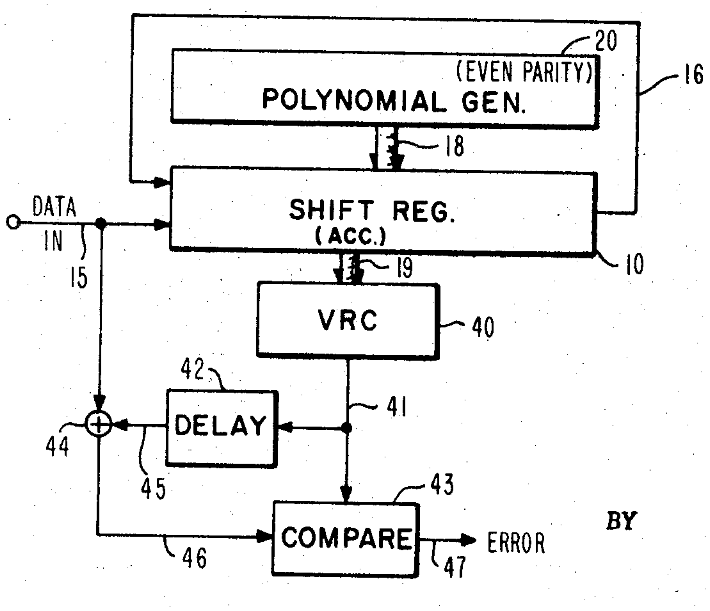
FIG. 2 illustrates one embodiment according to this invention for detecting malfunctions in equipment at a receiving station.

Reference is made next to FIG. 2 which shows the polynominal generator 20 and the shift register 10 in block form. Like numbers are used in FIGS. 1 through 3 to designate corresponding parts. Signals from the polynominal generator 20 are supplied through a cable 18 to the shift register 10. A vertical redundancy check circuit 40 responds to output signals supplied through a cable 19 from each of the stages 11 through 14 in FIG. 1 and provides an output signal on the line 41 which represents the actual parity of the content of the shift register 10. The vertical redundancy check circuit 40 may be any one of many conventional circuits which generate parity for given values. This generated parity is supplied to a delay device 42 which may be any type of temporary storage device such as a flip flop, delay line or the like. The parity signal on the line 41 is supplied also to a compare circuit 43. Input data on the line 15 is supplied to an exclusive Or circuit 44, and signals from the delay device 42 are supplied on a line 45 to the exclusive Or circuit 44. Output signals from the exclusive Or circuit 44 are supplied on a line 46 to the compare circuit 43. The output of the compare circuit 43 on a line 47 signifies whether or not an error is detected. The detection of errors is explained more fully hereinafter.

Figure 3:
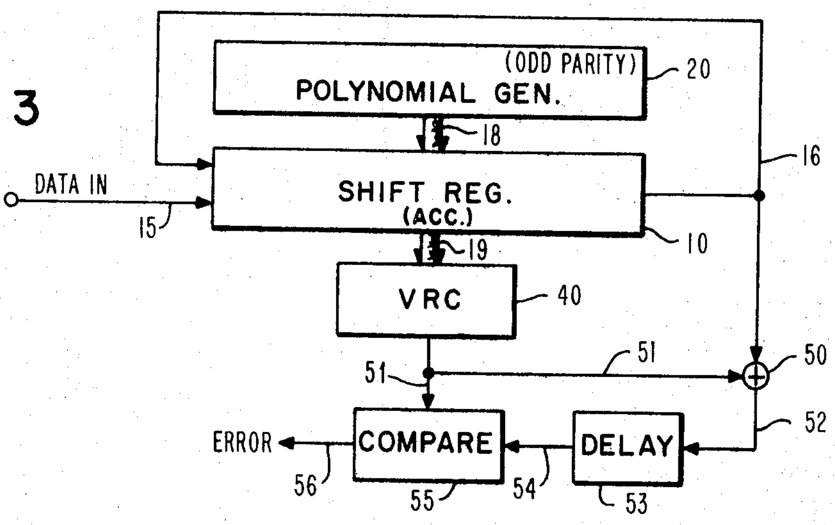
FIG. 3 illustrates another embodiment according to this invention for detecting equipment malfunctions at a receiving station.

Reference is made next to FIG. 3 wherein the polynominal generator 20 and the shift register 10 of FIG. 1 are shown in block form. The vertical redundancy check circuit 40 may be identical to that shown in FIG. 2. Output signals $R_{k-1}$ from the high order stage 14 of the shift register 10 are supplied on the line 16 to an exclusive Or circuit 50. The exclusive Or circuit 50 receives parity signals on a line 51 from the VRC 40. Output signals from the exclusive Or circuit 50 are supplied on a line 52 to a delay device 53 which in turn supplies its output signals on a line 54 to a compare circuit 55. The compare circuit 55 also receives parity signals on the line 51 from the VRC 40. Output signals from the compare circuit 55 on the line 56 signify whether or not an error is detected. The manner in which an error is detected is explained more fully subsequently.

The apparatus according to this invention is concerned with the problem of detecting failures in certain linear switching circuits. The invention is illustrated with respect to the detection of failures in circuits which develop check digits for polynomial checking, but the technique applies to linear switching circuits in general. The binary system of notation is used, although the concepts are applicable to other radices. Next, the background and basic philosophy of this invention are considered from a mathematical point of view, and the mathematical symbols of FIG. 1 are used below.

Given a sequence $$d_0, d_1 \ldots d_{n-1}, d_n$$

of binary digits to be transmitted, and a $k^{th}$ degree polynomial $$G(X)=X^k+g_{k-1}X^{k-1}+ \ldots g_1X+1$$

the theory of polynomial checking is based on the fact that there are unique polynomials $$Q(X)=q_nX^n+ \ldots +q_0$$

and $$R(X)=r_{k-1}X^{k-1}+ \ldots +r_1X+r_0$$

such that $$(d_nX^n+ \ldots +d_1X+d_0)X^k=Q(X)G(X)+R(X) \quad (1)$$

If, as assumed henceforth, the coefficients of the above polynomials are taken from the field of integers modulo 2 (binary digits) and are added modulo 2, then addition may be treated the same as subtraction, and Equation 1 may be expressed:

$$(d_nX_n+ \ldots +d_1X+d_0)X^k+R(X)=Q(X)G(X) \quad (2)$$

Thus, if one transmits $r_0, r_1 \ldots r_{k-1}, d_0 \ldots d_n$ the received message should be a multiple of (i.e., divisible by) the binary number corresponding to the sequence $1, g_{k-1}, g_{k-2} \ldots g_1, 1$. It is common usage to call G(X) the generator polynomial, R(X) (the remainder) the check character, and $D(X)=d_nX^n+ \ldots +d_1X+d_0$ the message polynomial.

Since the entire message is seldom accessible at a given time, it is desirable to use circuitry which develops the check character, R(X), as the digits $d_n, d_{n-1} \ldots$ are entered serially onto the line; and then, after the last information digit, $d_0$, has been entered, the check character, R(X), is serialized onto the line with the high order first. The circuit in FIG. 1 receives D(X) and divides by G(X) to develop R(X). Observe that register $R_i$ contains the coefficient of $X^i$ in the remainder; that is, after the $d_0$ input, $R_i$ contains $r_i$. One method of checking the circuitry in FIG. 1 is to perform a parity check on the $k$-bit character in the registers. It is clear that this parity (modulo 2 sum) varies between odd and even, and consequently the standard method for performing such a parity check is impractical. It is desirable to be able to determine independently the parity for time $t+1$ simply by using the parity at time $t$ (immediately after the $t^{th}$ input) and the input at time $t+1$, and then enter the $t+1^{st}$ input, calculate the actual parity of the result, and compare this result with the independently determined parity. The following result indicates how this may be done at a minimal increase in hardware.

First, some terminology is introduced which facilitates stating the result. Let:

$R_i(t)$=the contents of register $R_i$ at time $t$, for $$i=0, 1, 2 \ldots k-1$$

$I(t+1)$=the input at time $t+1$, for $t=0, 1, 2 \ldots$
$P(t)$=the parity at time $t$.

By definition, $$P(t)=\sum_{i=0}^{k-1}\oplus R_i(t)=R_0(t)\oplus R_1(t)\oplus \ldots \oplus R_{k-1}(t) \quad \text{(modulo 2)}$$

Further, let it be agreed to designate the generator polynomial as $$G(X)=X^k+g_{k-1}X^{k-1}+ \ldots +g_1X+1$$

of even parity (or odd parity) if the modulo 2 sum $$\sum_{i=0}^{k-1} g_i \text{ is zero (or one)}$$

Furthermore, the independently determined parity for the circuit of FIG. 1 may be expressed:

$$P(t+1)=\begin{cases}P(t)\oplus I(t+1), & \text{if G(X) is of even parity}\\ P(t)\oplus R_{k-1}(t), & \text{if G(X) is of odd parity}\end{cases} \quad (3)$$

Hence, the parity at time $t+1$ is the modulo 2 sum of the parity at time $t$ and the contents of the high-order register $R_{k-1}$ at time $t$, if the generator polynomial has an odd number of terms; otherwise it is the modulo 2 sum of the parity at time $t$ and the input at time $t+1$.

Next, consideration is devoted to the mathematical description and analysis of circuits such as shown in FIG. 1, and this includes a verification of Formula 3. Indeed, a logical analysis of the circuit of FIG. 1 serves to verify Formula 3.

Let the state of the circuit in FIG. 1 at time $t$ be denoted by the $k$-vector $$\vec{R}(t)=(R_0(t)\ \ldots\ R_{k-1}(t))$$

Interest lies in $$\vec{R}(t+1) \text{ as a function of } \vec{R}(t)$$

and the input $I(t+1)$. The relationship is:

$$R(t=1)=\vec{R}(t)\cdot T\oplus(0,\ 0\ \ldots\ I(t+1))\cdot T \quad (4)$$

where T is the $k$-by-$k$ matrix:

$$T=\begin{bmatrix} 0 & 1 & 0 & \cdot & \cdot & \cdot & 0 \\ 0 & 0 & 1 & \cdot & \cdot & \cdot & 0 \\ 0 & 0 & 0 & \cdot & \cdot & \cdot & 0 \\ \cdot & \cdot & \cdot & & & & \cdot \\ \cdot & \cdot & \cdot & & & & \cdot \\ \cdot & \cdot & \cdot & & & & \cdot \\ 0 & 0 & 0 & \cdot & \cdot & \cdot & 1 \\ 1 & g_1 & g_2 & \cdot & \cdot & \cdot & g_{k-1} \end{bmatrix} \quad (5)$$

The matrix multiplication is carried out in the ordinary manner, but the arithmetic is carried out modulo 2.

To verify Formula 3, merely observe that $$P(t)=\vec{R}(t)\cdot\begin{bmatrix}1\\1\\\cdot\\\cdot\\\cdot\\1\end{bmatrix}$$

Hence, from Formulas 4 and 5, $$P(t+1)\left[\vec{R}(t)\cdot T\oplus(0,0\ \ldots\ I(t+1))\cdot T\right]\cdot\begin{bmatrix}1\\1\\\cdot\\\cdot\\\cdot\\1\end{bmatrix}$$

$$=\left[\vec{R}(t)\oplus(0,0\ \ldots\ I(t+1))\right]\cdot T\cdot\begin{bmatrix}1\\1\\\cdot\\\cdot\\\cdot\\1\end{bmatrix}$$

$$=\left[\vec{R}(t)\oplus(0,0\ \ldots\ I(t+1))\right]\cdot\begin{bmatrix}1\\1\\\cdot\\\cdot\\\cdot\\1\oplus\sum_{i=1}^{k-1}\oplus g_i\end{bmatrix}$$

Now, if G(X) is of odd parity (odd number of the $g_i$'s are one), then $$\sum_{i=1}^{k-1}\oplus g_i=1$$

hence $$1\oplus\sum_{i=1}^{k-1}\oplus g_i=1\oplus 1=0$$

and $$P(t+1)=\left[\vec{R}(t)\oplus(0,0\ \ldots\ I(t+1))\right]\cdot\begin{bmatrix}1\\1\\\cdot\\\cdot\\\cdot\\1\\0\end{bmatrix}$$

$$=R_0(t),R_1(t)\ \ldots\ R_{k-1}(t))\cdot\begin{bmatrix}1\\1\\\cdot\\\cdot\\\cdot\\1\\0\end{bmatrix}$$

$$=R_0(t)+R_1(t)+\ \ldots\ +R_{k-2}(t) \quad \text{(modulo 2)}$$

But $$P(t)=R_0(t)+R_1(t)+\ \ldots\ +R_{k-2}(t)+R_{k-1}(t) \quad \text{(modulo 2)}$$

hence $$P(t+1)=P(t)-R_{k-1}(t)$$

and since addition may be treated the same as subtraction in the binary system of notation $$P(t+1)=P(t)\oplus R_{k-1}(t)$$

which is the result in Formula 3. Similarly, if G(X) is of even parity, $$1\oplus\sum_{i=1}^{k-1}\oplus g_i=1\oplus 0=1$$

and $$P(t+1)=R_0(t)+\ \ldots\ +R_{k-1}(t)+I(t+1)$$
$$=P(t)\oplus I(t+1) \quad \text{(modulo 2)}$$

Thus Formula 3 is verified.

Some useful facts about these T matrices are pointed out.

First, T is a nonsingular matrix. In fact, $$T^{-1}=\begin{bmatrix} g_1 & g_2 & \cdot & \cdot & \cdot & g_{k-1} & 1 \\ 1 & 0 & \cdot & \cdot & \cdot & 0 & 0 \\ 0 & 1 & \cdot & \cdot & \cdot & 0 & 0 \\ \cdot & & & & & \cdot & \cdot \\ \cdot & & & & & \cdot & \cdot \\ \cdot & & & & & \cdot & \cdot \\ 0 & 0 & \cdot & \cdot & \cdot & 1 & 0 \end{bmatrix}$$

Also, T satisfies the matrix equation:

$$G(T)=T^k+g_{k-1}T^{k-1}+\ \ldots\ +g_1T+I=\text{zero matrix} \quad (7)$$

Finally, G(X) is a primitive polynomial (the least power of X such that G(X) divides $X^M+1$ is $M=2^k-1$) if and only if $T^{2^k-1}=I$ (the identity matrix) and no $M<2^k-1$ gives $T^M=I$. These properties are quite useful when analyzing the error-detection capabilities of various generators. See further Error-Correcting Codes by W. W. Peterson, The MIT Press, Massachusetts Institute of Technology, Cambridge, Massachusetts, 1961.

Next the implementation of the logic in Formula 3 is discussed. FIG. 2 is concerned with the implementation of that part of Formula 3 where G(X) is of even parity. The parity of time $t$ is available as a signal on the line 41 from the VRC 40. This signal is delayed in the circuit 42 until time $t+1$ at which time the delayed parity $P(t)$ bit appears on the line 45 simultaneously as the input bit $I(t+1)$ appears on the line 15. Both of these signals are applied to the exclusive Or circuit 44, and the output signal on the line 46 represents the predicted parity $P(t+1)$ which is supplied to the compare circuit 43 simultaneously as the actual parity calculated by the VRC 40 is supplied on the line 41 to the compare circuit 43. The signal on the line 41 representing the actual parity for the content of the shift register 10 should be the same as the signal on the line 46 representing the predicted parity, if all of the circuits in FIG. 2 are operating properly. If these two parity signals are unlike, it indicates a malfunction in one or more of the circuits shown in FIG. 2. The output of the compare circuit 43 on the line 47 signifies whether or not a malfunction is detected. If the output signal on the line 47 indicates an error, the error must be a malfunction in the circuitry of FIG. 2, not an error in the received data. In this connection it is pointed out that at the end of data transmission the content of the shift register 16 in FIG. 1 has a predetermined value if the received data is free of errors; otherwise, the content of the shift register 16 holds a different value, thereby signifying an error in the received data. This is more fully explained in Patent 3,336,467, for example. The circuit in FIG. 2 responds to input data, error free or not, to provide (1) an actual parity signal on the line 41, based on the content of the shift register 10, and (2) a predicted parity on the line 46 determined from the incoming data bit and the delayed actual parity of the preceding time period. If these two parity bits are unlike, then a malfunction in the circuitry in FIG. 2 is unequivocally indicated by an error signal on the line 47.

Reference is made next to FIG. 3 for a discussion of the implementation of that part of Formula 3 for the case where G(X) is of odd parity. The parity at time *t* is determined by the VRC 40 and supplied on the line 51 to the exclusive Or circuit 50 simultaneously as the output signal $R_{k-1}$ from the high order stage 14 of the shift register 10 is supplied on the line 16 to the exclusive Or circuit 50. The output signal at time *t* on the line 52 from the exclusive Or circuit 50 represents the predicted parity for time $t+1$, and it is delayed in the circuit 53 and supplied at time $t+1$ on the line 54 to the compare circuit 55. The signal on the line 51 at time $t+1$ represents the actual parity as determined by the VRC 40 from the content of the shift register 10 at that time, and it is compared with the predicted parity on the line 54 in the compare circuit 55. If these two parity signals are alike, no error is indicated on the output line 56, and this signifies correct operation of all circuits in FIG. 3. If these two parity signals are unlike, an error signal is developed on the output line 56, signifying a malfunction in the circuitry of FIG. 3. The error signal on the line 56 signifies unequovically a malfunction in the circuitry of FIG. 3, not an error in the received data for reason set forth above.

Thus it is seen that a unique and novel method and apparatus is provided according to this invention for detecting a malfunction in equipment, and such detection is provided for each bit period of a serial data transmission. Furthermore, such improved checking arrangement is provided with a relatively nominal quantity of hardware.

While the invention has been particularly shown and described with reference to preferred embodiments thereof, it will be understood by those skilled in the art that various changes in form and details may be made therein without departing from the spirit and scope of the invention.

What is claimed is:

1. A data handling device having a multistage shift register which receives components of message signals D(X) in successive time periods and arithmetic means coupled to the multistage shift register which modifies the message signals by a polynomial G(X), the improvement comprising:

(1) first means responsive to the content of the multistage shift register for developing a signal indicative of the actual parity of its content during each successive time period, (2) second means for generating a predicted parity signal including an exclusive Or circuit having a first input connected to the highest order stage of the multistage shift register and a second input connected to the first means for receiving the signal indicative of the actual parity of the content of the multistage shift register, a storage delay circuit, the exclusive Or circuit providing an output signal representing predicted parity which is coupled to the storage delay circuit, (3) third means coupled to the first means and the storage delay circuit of the second means which responds to the actual parity signal and the predicted parity signal for developing an error signal whenever the actual parity signal is unlike the predicted parity signal.

2. In a data handling apparatus having a multistage shift register for receiving input data bit signals in successive time periods and processing such data, includng modification thereof, the improvement comprising:

first means for generating an actual parity signal for the data bits in the shift register during each successive time period, second means for generating a predicted parity signal for the data bits in the shift register during each successive time period, said second means developing the predicted parity signal at time period $t+1$ from the actual parity signal of time period *t* and the input data bit signal I at time period $t+1$, and third means for comparing the actual parity signal and the predicted parity signal during each successive time period thereby to indicate any circuit malfunction during each successive time period.

3. In a data handling apparatus having a multistage shift register for receiving input data bit signals in successive time periods and processing such data, includng modification thereof, the improvement comprising:

first means for generating an actual parity signal for the data bits in the shift register during each successive time period, second means for generating a predicted parity signal for data bits in the shift register during each successive time period, said second means developing the predicted parity signal at time period $t+1$ from the actual parity signal of time period *t* and the signals $R_{k-1}$ from the highest order data bit stage of the multistage srift register at time period *t*, and third means for comparing the actual parity signal and the predicted parity signal during each successive time period thereby to indicate any circuit malfunction during each successive time period.

4. A method for detecting equipment malfunction in a data handling apparatus having a multistage shift register which receives data signals in successive time periods and modifies them by a polynomial G(X), the method comprising the steps of:

(1) generating an actual parity signal from the content of the multistage shift register, (2) generating a predicted parity signal from the incoming data signal and the actual parity signal of the preceding time period where even parity is employed in the polynomial G(X), (3) comparing the actual parity signal and the predicted parity signal in each successive time period, and (4) providing an error signal when the actual parity signal and the predicted parity signal are unlike.

5. A method for detecting equipment malfunction in a data handling apparatus having a multistage shift register which receives data signals in successive time periods and modifies them by a polynomial G(X), the method comprising the steps of:

(1) generating an actual parity signal from the content of the multistage shift register, (2) generating a predicted parity signal from the output of the highest order stage of the multistage shift register and the actual parity signal of the preceding time period where odd parity is employed in the polynomial G(X), (3) comparing the actual parity signal and the predicted parity signal in each successive time period, and (4) providing an error signal when the actual parity signal and the predicted parity signal are unlike.

6. A data handling device having a multistage shift register which receives components of incoming message signals D(X) in successive time periods and arithmetic means coupled to the multistage shift register which modifies the message signals by a polynomial G(X), the improvement comprising:

(1) first means responsive to the content of the multistage shift register for developing a signal indicative of the actual parity of its content during each successive time period, (2) second means responsive to (a) the incoming data signal when even parity is used in the polynomial G(X) and (b) the actual parity signal of the preceding time period thereby to generate a predicated parity signal for the content of the shift register, and (3) third means connected to the first and second means which responds to the actual parity signal and the predicted parity signal for developing an error signal whenever the actual parity signal is unlike the predicted parity signal.

7. The apparatus of claim 6 wherein the second means includes an exclusive Or circuit and a storage delay circuit, the exclusive Or circuit having one input connected to receive the message signals D(X) and a second input connected to a storage delay circuit, the storage delay circuit being connected to receive and delay for substantially one successive time period signals from the first means indicative of the actual parity of the content of the multistage shift register, the exclusive Or circuit having an output signal representing predicted parity which is supplied to the third means.

8. A data handling device having a multistage shift register which receives components of incoming message signals D(X) in successive time periods and arithmetic means coupled to the multistage shift register which modifies the message signals by a polynomial G(X), the improvement comprising:

(1) first means responsive to the content of the multistage shift register for developing a signal indicative of the actual parity of its content during each successive time period, (2) second means responsive to (a) the output of the highest order stage of the multistage shift register when odd parity is used in the polynomial G(X) and (b) the actual parity signal of the preceding time period thereby to generate a predicted parity signal for the content of the shift register, and (3) third means responsive to the actual parity signal and the predicted parity signal for developing an error signal whenever the actual parity signal is unlike the predicted parity signal.

9. The apparatus of claim 8 wherein the second means includes an exclusive Or circuit having a first input connected to the highest order stage of the multistage shift register and a second input connected to the first means which supplies a signal indicative of the actual parity of the content of the multistage shift register, a storage delay circuit connected between the exclusive Or circuit and the third means for supplying a predicted parity signal to the third means.

10. A data handling device having a multistage shift register which receives components of message signals D(X) in successive time periods and arithmetic means coupled to the multistage shift register which modifies the message signals by a polynomial G(X), the improvement comprising:

(1) first means responsive to the content of the multistage shift register for developing a signal indicative of the actual parity of its content during each successive time period, (2) second means for generating a predicted parity signal including an exclusive Or circuit having one input connected to receive the message signals D(X) and a second input connected to a storage delay circuit, the storage delay circuit being connected to receive and delay for substantially one successive time period signals from the first means indicative of the actual parity of the content of the multi-stage shift register, the exclusive Or circuit providing an output signal representing predicted parity, (3) third means coupled to the first means and the exclusive Or circuit of the second means which responds to the actual parity signal and the predicted parity signal for developing an error signal in any successive time period whenever the actual parity signal is unlike the predicted parity signal.

References Cited

UNITED STATES PATENTS 3,469,236 9/1969 Gallager ---------- 340—146.1

MALCOLM A. MORRISON, Primary Examiner

R. S. DILDINE, Jr., Assistant Examiner